United States Patent [19]

Green et al.

[11] 4,085,428

[45] Apr. 18, 1978

[54] APPARATUS FOR RECORDING AND REPRODUCING INFORMATION WITH RESPECT TO A FLEXIBLE RECORDING MEDIUM

[75] Inventors: Keith Green, Kinross; Alastair Lawson, Glenrothes, both of Scotland

[73] Assignee: Burroughs Corporation, Detroit, Mich.

[21] Appl. No.: 704,902

[22] Filed: Jul. 20, 1976

[51] Int. Cl.² .................. G11B 5/48; G11B 21/08; G11B 15/60
[52] U.S. Cl. ............................ 360/99; 360/86; 360/105; 360/130
[58] Field of Search ............... 360/99, 105–106, 360/130, 86, 98

[56] References Cited

U.S. PATENT DOCUMENTS

| | | | |
|---|---|---|---|
| 3,713,121 | 1/1973 | Fasano et al. | 360/105 |
| 3,747,938 | 7/1973 | van der Hilst et al. | 360/130 |
| 3,946,439 | 3/1976 | Castrodale | 360/99 |
| 4,001,888 | 1/1977 | Morgan | 360/130 |

*Primary Examiner*—Alfred H. Eddleman
*Attorney, Agent, or Firm*—Gerald J. Woloson; Benjamin J. Barish; Kevin R. Peterson

[57] ABSTRACT

A pair of mutually-offset, selectively-engageable transducers read and write information on opposite surfaces of a flexible disk magnetic recording medium. Operative contact between each transducer and the flexible surface is established by one of an offset pair of pressure pads which ride on the opposite side of the disk from and directly aligned with the corresponding transducer. The selective engagement of each transducer with the flexible medium results from the selective activation of control devices which pull one or the other of the spring-loaded pressure pads away from the disk surface.

8 Claims, 6 Drawing Figures

APPARATUS FOR RECORDING AND REPRODUCING INFORMATION WITH RESPECT TO A FLEXIBLE RECORDING MEDIUM

BACKGROUND OF THE INVENTION

The present invention relates to apparatus for recording and reproducing information with respect to opposite surfaces of a flexible recording medium. The invention is particularly useful for magnetically recording and reproducing information with respect to opposite surfaces of a flexible magnetic recording disk, and is therefore described below in connection with that application.

Flexible magnetic recording disks, sometimes called "floppy disks", are increasingly being used as storage devices in computers and other data processing systems. Such disks can be produced very inexpensively compared to the conventional rigid or "hard" disks, but as a rule their storage capacity is considerably less because of the smaller size and lower track density normally permitted by the nature of such flexible disks.

An object of the present invention is to provide a novel arrangement for recording and reproducing information with respect to opposite surfaces of a flexible recording medium. The novel arrangement of the invention is particularly suitable for use with flexible magnetic recording disks (i.e. "floppy disks") for increasing their storage capacity, but could also advantageously be used with other flexible recording media, such as magnetic tape, optical disks or tape, and the like.

SUMMARY OF THE INVENTION

According to a broad aspect of the present invention, there is provided apparatus for recording and reproducing information with respect to opposite surfaces of a flexible recording medium, comprising, a pair of mounting means spaced from each other for receiving the flexible recording medium therebetween; each of said mounting means including a transducer device and a pressure device cooperable with one surface of the flexible recording medium, the transducer device of one mounting means cooperable with one surface of the flexible recording medium being aligned with the pressure device of the other mounting means cooperable with the opposite surface of the flexible recording medium; and selection means for selecting fthe transducer device to be operative for recording and reproducing information with respect to its respective surface of the flexible recording medium, said selection means including actuating means for selectively actuating one of said devices cooperable with one surface of the flexible recording medium to cause same to press the opposite surface thereof against the aligned device cooperable with the opposite surface of the flexible recording medium.

According to another feature of the invention, applicable particularly with respect to the preferred embodiment described below, the pair of mounting means comprise a pair of aligned cantilever arms spaced from each other for receiving the flexible recording medium therebetween, the transducer device being transducer heads each fixedly mounted on one of said arms, the pressure devices being pressure pads each pivotably mounted on one of said arms, the pressure pads being selectively pivoted by said selection means.

According to a further feature of the described embodiment, one arm carries its transducer head at its end and its pressure pad inwardly of its end, and the other arm carries its pressure pad at its end aligned with the transducer head of said one arm, said other arm carrying its transducer head inwardly of its end aligned with the pressure pad of said one arm.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENT

Figure 1:
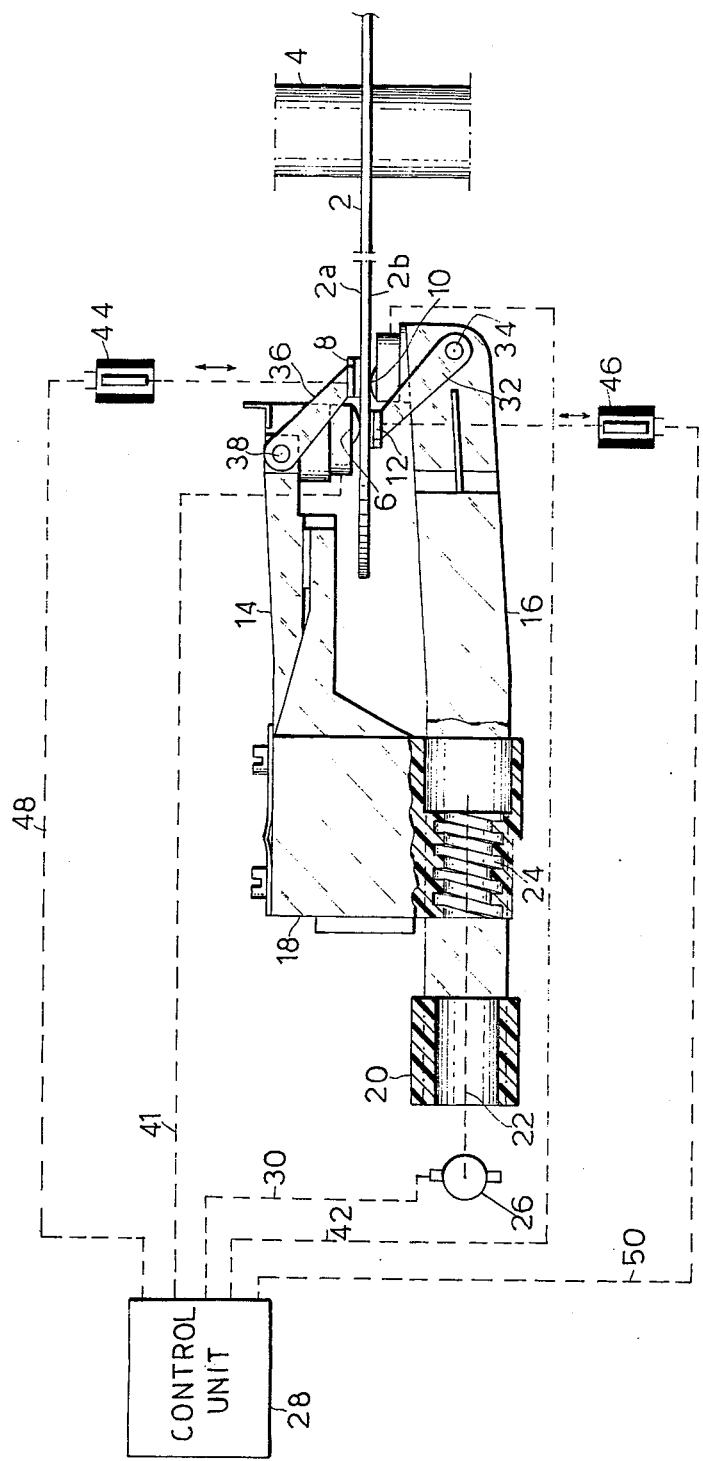
FIG. 1 diagrammatically illustrates one form of apparatus constructed in accordance with the invention.

The apparatus, illustrated in FIG. 1 is for magneticly recording and reproducing information with respect to both opposed surfaces of a flexible magnetic recording disk, generally designated 2, rotated on a spindle 4. Generally speaking, the apparatus includes a transducer device 6 and a pressure device 8 cooperable with one surface 2a of disk 2, and a second transducer device 10 and pressure device 12 cooperable with the opposite surface 2b of the disk. In the described apparatus, the two transducer devices 6, 10 are in the form of magnetic recording heads, and the two pressure devices 8, 12, are in the form of pressure pads. Pressure pad 12 cooperable with surface 2b of the disk is aligned with magnetic head 6 cooperable with the opposite surface 2a of the disk; and pressure pad 8 cooperable with surface 2a is aligned with magnetic head 10 cooperable with the opposite surface 2b of the disk.

The two magnetic heads (6, 10) and the two pressure pads (8,12) are supported by a pair of cantilever arms 14,16 carried by a carriage block 18. Block 18 carries a guide member 20 formed with a bore which receives the end of a screw drive 22. The latter is received within a threaded bore 24 formed in carriage block 18 and is driven by a motor 26 to move the magnetic heads 6, 10 radially inwardly or outwardly with respect to flexible disk 2 in order to select a recording track thereon. The control system for controlling motor 26, and thereby for selecting a particular track on the record disk 2, is schematically indicated by block 28 controlling motor 26 via line 30.

The lower arm 16 of carriage block 18 carries its magnetic recording head 10 at the end of the arm, and its pressure pad 12 slightly inwardly of its end. Pressure pad 12 is carried by a bail-like member 32 pivotably mounted by pin 34 along an axis perpendicular to the longitudinal axis of arm 16.

The upper arm 14 of carriage block 18 is slightly shorter than the lower arm 16, and the pressure pad 8 of the upper arm is carried at the end of the arm in alignment with magnetic head 10 of the lower arm. Magnetic head 6 of the upper arm 14 is spaced slightly inwardly of the arm so as to be in alignment with pressure pad 12 of the lower arm 16. As in the case of the lower arm 16, pressure pad 8 of the upper arm 14 is carried by a bail 36 pivotably mounted by pin 38 along an axis perpendicular to the longitudinal axis of arm 14.

Figure 3:
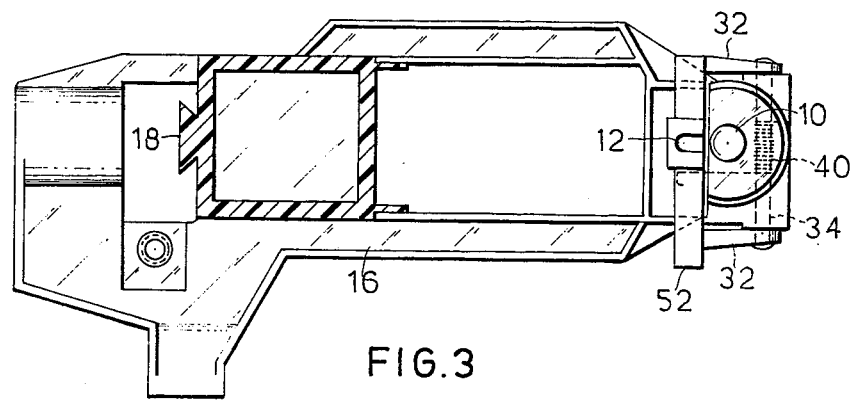
FIG. 3 is a view, partly in section, along lines III—III of FIG. 2.

As shown particularly in FIG. 3, pressure pad 12 on arm 16 is urged upwardly towards its aligned magnetic head 6 on arm 14 by means of a spring 40 encircling pin 34 of its bail 32. Pressure pad 8 on arm 14 is similarly urged by a spring (not shown) towards its aligned magnetic head 10 carried by the lower arm 16.

The pressure pads 8 and 12 are thus both spring-biassed towards their respective heads 10 and 6, respectively, thereby tending to press the opposite surfaces of the flexible recording disk 2 against both of the magnetic heads. However, only one of the magnetic heads in operative at any one time, and the pressure pads (8,12) are controlled so that the one opposite to the operative head is actuated to press the disk against the operative head.

The magnetic head 6 or 10 selected for operation is controlled by the schematically-shown control box 28 (FIG. 1) via control lines 41, 42. A pair of solenoids 44, 46, also selectively controlled by box 28 via lines 48, 50, select the appropriate pressure pad 8 or 12 to be effective to press the flexible recording disk 2 against the operative magnetic head. In the described arrangement, each of the bail springs (e.g., 40 for the lower bail 32) urges its respective pressure pad against the recording disk to press same against its aligned magnetic head, and the solenoid (44 or 46) for the pressure pad of the non-operative head is actuated to bear against a ledge 52 (FIG. 3) formed on the respective bail and to pivot same, and its pressure pad, away from the recording disk, thereby leaving the pressure pad opposed only to the operative head pressing the flexible disk against the operative head.

The lower arm 16 is fixed to the carriage block 18. Preferably, it is integrally formed therewith of plastic. The upper arm 14, however, is spring-hinged to the carriage block to permit the upper arm to be swung away from the lower arm 16, and thereby to facilitate the introduction and removable of the flexible recording disk 2 from between the two arms.

Figure 2:
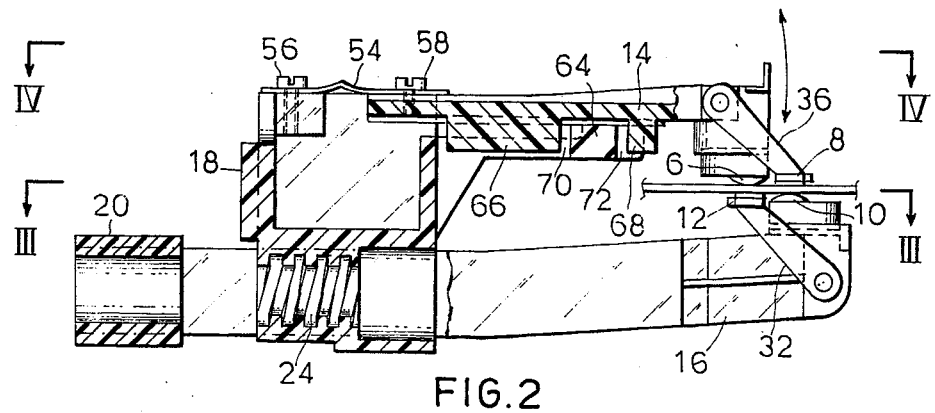
FIG. 2 is a side elevational view of the arrangement for supporting the magnetic heads in the apparatus of FIG. 1.
Figure 4:
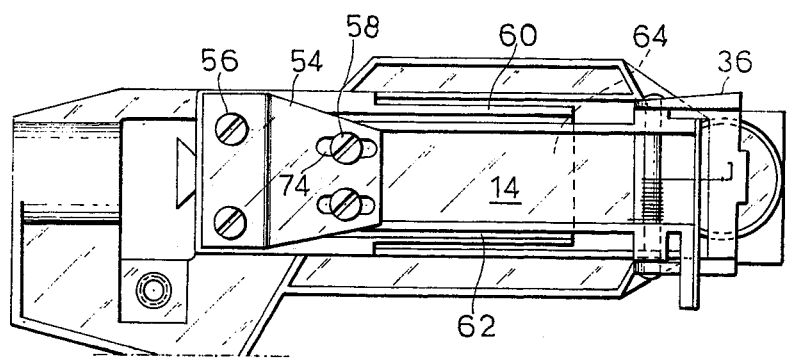
FIG. 4 is a plan view along line IV—IV of FIG. 2.
Figure 5A:
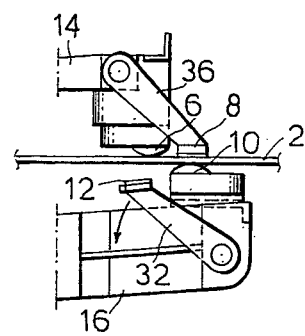
FIGS. 5a and 5b are fragmentary views illustrating, respectively, the two positions of the main members when the two magnetic heads are selectively made operative to record on or reproduce from their respective surfaces of the flexible recording disk.
Figure 5B:
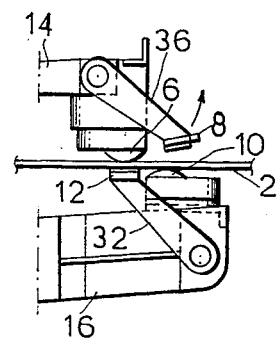

The spring-hinge mounting for the upper arm 14 is best shown in FIGS. 2 and 4. It includes a flat leaf spring 54 fixed at one end to the carriage block 18 by means of a pair of threaded fasteners 56, and fixed at the opposite end to the upper arm 14 by a second pair of threaded fasteners 58. The upper end of carriage block 18 is formed with a pair of short vertical ledges 60, 62 and with an elongated horizontal ledge 64. The upper arm 14 is disposed within the short vertical ledges 60, 62, and is spring-urged by the leaf spring 54, which is prestressed for this purpose, against the horizontal ledge 64 to fix the normal position of the arm, and thereby of its magnetic head 6 and pressure pad 8. Arm 14, however, may be swung upwardly by means of the leaf spring 54 away from the horizontal ledge 64 in order to introduce or remove the flexible recording disk from between the two arms 14 and 16.

The upper arm 14 and the horizontal ledge 64 of carriage block 18 include cooperable guiding projections and recesses for guiding the above swinging movement of the upper arm. These guiding surfaces, in the described embodiment, are constituted by a pair of projections 66, 68 formed on the lower surface of the upper arm 14, receivable within notches or recesses 70, 72 formed on the horizontal ledge 64 of the carriage block.

To facilitate adjustment of the upper arm 14 and its magnetic head with respect to the lower arm and its magnetic head. the leaf-spring 54 mounting the upper arm 14 is provided with elongated slots 74 to permit the adjustment of the leaf spring with respect to fasteners 58, and likewise the notches 70, 72 formed on horizontal ledge 64 are also elongated for cooperation with projection 66, 68 depending on the lower surface of arm 14. Thus, to adjust the position of arm 14 and its magnetic head 6, it is only necessary to loosen fasteners 58, move arm 14 to the precise position, and then retighten the fasteners.

Pressure pads 8 and 12 may be made of any suitable material, for example plastic, synthetic fibres, or a combination of both, as known particularly with respect to magnetic tape recording devices, to provide a sliding low-frictional contact with the recording medium.

The apparatus illustrated in the drawings used in the following manner.

First, whenever a flexible recording disk 2 is to be introduced or removed, this may be normally done by swinging the upper arm 14 upwardly about its leaf-spring hinge 54. The upper arm may be precisely positioned with respect to the disk by loosening and then tightening fasteners 58 as described above.

During the operation of the apparatus, control system 28 controls, via its line 30, drive motor 26 to move the carriage block 18 to align the two magnetic heads 6 and 10 with respect to the selected track on the flexible disk 2. This control system also controls, via lines 41 and 42, which of the two magnetic heads (6 or 10) is to be operative with respect to its respective surface (2a, 2b) of the recording disk. This control system further selects, via lines 48, 50, the solenoid (44 or 46) to be energized for causing the pressure pad (8 or 12) corresponding to the operative magnetic head to press the disk against the operative head.

Thus, if magnetic head 6 is to be the operative one, for recording or reproducing with respect to surface 2a of the flexible disk 2, solenoid 44 is energized so as to pivot pressure pad 8 away from the recording disk 2, thereby permitting pressure pad 12, under the influence of its bail spring 40 to bear against surface 2b of the disk, and thereby to press the opposite surface 2a against the operative magnetic head 6 with which pad 8 is aligned. Accordingly, magnetic head 6 will be in operative position for recording and reproducing with respect to surface 2a of the record disk. On the other hand, if magnetic head 10 is selected to be the operative one, pressure pad 12 is pivoted by its solenoid 46 away from the record disk, permitting pressure pad 8, under the influence of its bail spring, to press against magnetic head 10, thereby permitting that head to record or reproduce with respect to surface 2b of the record disk.

While the invention has been described with respect to apparatus for recording and reproducing information with respect to opposite surfaces of a flexible magnetic recording disk, it will be appreciated that the invention, or features thereof, could be used in other applications, for example with respect to magnetic tape, or optical disks or tape, as indicated above.

Many modifications, variations, and other applications of the illustrated embodiment will be apparent.

What is claimed is:

1. Apparatus for recording and reproducing information with respect to opposite surfaces of a flexible recording medium, comprising:
   A. first and second aligned cantilever arms spaced from each other for receiving the flexible recording medium therebetween;
   B. the first of said aligned cantilever arms including a transducer head and a pressure pad both cooperable with one surface of the flexible recording medium, the second aligned cantilever arm including a transducer head and pressure pad cooperable with the other surface of the flexible recording medium, each transducer head fixedly mounted to the arm and each pressure pad pivotally mounted to the arm, the transducer head of the first arm being carried at the end of the arm with the pressure pad of the first arm being carried inwardly of the end, the transducer head of the second arm being carried inwardly of the end of the arm and the pressure pad of the second arm being carried at the end of the arm, where the pressure pad of each arm on one side of the disk is aligned with the transducer head of the other arm on the other side of the disk;
   C. selection control means for selecting the transducer head to be operative for recording and reproducing information with respect to its respective surface of the flexible recording medium;
   D. said selection control means including actuating means for selectively pivoting each pressure pad to cause said pressure pad to press the opposite surface of the flexible recording medium against the aligned transducer head cooperable with the opposite surface of the flexible recording medium; and
   E. mounting means for holding said first and second aligned cantilever arms in operative proximity to the flexible recording medium.

2. Apparatus according to claim 1, wherein said pressure pads are each carried by a bale pivotally mounted on the respective arm along on axis perpendicular to the longitudinal axis of the arm.

3. Apparatus according to claim 2, wherein said mounting means further includes:
   block mounting means for supporting said cantilever arms in parallel spaced relationship, one of said arms being fixed to said block mounting means, the other of said arms being spring-hinged to permit same to be swung away from said one arm to facilitate the introduction and removal of the flexible recording medium from beneath the arms.

4. Apparatus according to claim 3, wherein said spring-hinged arm and said block mounting means include a guiding projection on one cooperable with a recess on the other for guiding the spring-hinged arm during its swinging movement.

5. Apparatus according to claim 4, wherein said actuating means comprises a spring for each pressure pad, for urging same toward the aligned transducer head with which it cooperates, and a solenoid for each pressure pad effective when actuated to pivot the pressure pad away from the transducer head with which it is aligned.

6. Apparatus according to claim 5, wherein said transducer heads are magnetic heads for magnetically recording and reproducing information with respect to opposite surfaces of a flexible magnetic recording disk.

7. Apparatus according to claim 6, wherein said mounting means further includes moveable carrier means for positioning the magnetic heads and their respective pressure pads with respect to selected tracks on the flexible magnetic recording disk.

8. Apparatus for recording and reproducing information with respect to opposite surfaces of a flexible recording medium, comprising:
   A. a plurality of offset transducer means for recording and reproducing information with respect to nonmutually-aligned portions of opposite surfaces of the flexible recording medium;
   B. a plurality of pressure means for applying pressure to medium surface segments opposite from and directly aligned with each of the plurality of offset transducer means;
   C. support means for mounting said plurality of offset transducer means in mutually-offset relationship on opposite sides of said flexible recording medium, for adjustably mounting said plurality of pressure means on opposite sides of the recording medium in alignment with each of the plurality of offset transducer means, for enabling said offset transducer means and said pressure means to be moved so as to allow insertion and removal of the flexible recording medium therebetween, and for positioning said offset transducer means and their associated pressure means with respect to selected portions on the flexible recording medium;
   D. selection control means for selecting the offset transducer means to be operative for recording and reproducing information with respect to its respective portion of the flexible recording medium; and
   E. engagement acutator means, responsive to said selection control means, for selectively adjusting the pressure means aligned with the operative offset transducer means, to cause said adjustable pressure means to bring the operative offset transducer means into transducing contact with its respective portion of the recording medium.

* * * * *